US007039092B1

(12) United States Patent
Cao et al.

(10) Patent No.: US 7,039,092 B1
(45) Date of Patent: May 2, 2006

(54) CODE BRANCH ALLOCATION FOR CDMA SYSTEMS

(75) Inventors: Qiang Cao, Swindon (GB); Seau Sian Lim, Swindon (GB); Jens Mueckenheim, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/936,104

(22) PCT Filed: Feb. 28, 2000

(86) PCT No.: PCT/GB00/00696

§ 371 (c)(1),
(2), (4) Date: Sep. 7, 2001

(87) PCT Pub. No.: WO00/54443

PCT Pub. Date: Sep. 14, 2000

(30) Foreign Application Priority Data

Mar. 10, 1999 (EP) .................................. 99301810

(51) Int. Cl.
*H04B 1/707* (2006.01)
*H04B 7/216* (2006.01)
(52) U.S. Cl. ...................................... 375/140; 370/335
(58) Field of Classification Search ............... 375/130, 375/134, 140, 141, 146, 147, 149; 370/335, 370/342, 441
See application file for complete search history.

(56) References Cited

U.S. PATENT DOCUMENTS

| 5,715,236 | A | * | 2/1998 | Gilhousen et al. | 370/209 |
|---|---|---|---|---|---|
| 6,041,034 | A | * | 3/2000 | Fukumasa et al. | 370/203 |
| 6,091,757 | A | * | 7/2000 | Cudak et al. | 375/130 |
| 6,108,369 | A | * | 8/2000 | Ovesjo et al. | 375/146 |
| 6,163,524 | A | * | 12/2000 | Magnusson et al. | 370/208 |
| 6,477,158 | B1 | * | 11/2002 | Take | 370/335 |
| 6,693,952 | B1 | * | 2/2004 | Chuah et al. | 375/140 |

FOREIGN PATENT DOCUMENTS

| EP | 0 814 581 A2 | 12/1997 |
|---|---|---|
| WO | WO 95/03652 | 2/1995 |

OTHER PUBLICATIONS

Multi-Code CDMA Wireless Personal Communications Networks by Chih-Lin I and Richard D. Gitlin.

* cited by examiner

*Primary Examiner*—Robert J. Pascal
*Assistant Examiner*—Krista M. Flanagan

(57) ABSTRACT

There is disclosed a method of allocating a channelisation code comprising, for each user, defining a path in the code tree based on a required range of spreading factors, selecting a node of the path in dependence on the currently required spreading factor; and reserving all nodes on the code tree in an upward and downward direction from the selected node, wherein the selected node for any user must not coincide with a node reserved by any other user.

5 Claims, 8 Drawing Sheets

CODE BRANCH ALLOCATION FOR CDMA SYSTEMS

FIELD OF THE INVENTION

The present invention relates to the allocation of code branches in the uplink, and the downlink of CDMA (code division multiple access) systems, and particularly but not exclusively to UMTS (Universal Mobile Telecommunication System).

BACKGROUND TO THE INVENTION

In UMTS (Universal Mobile Telecommunication System), the channelisation code dictates the bandwidth allocated to a particular service. In the uplink, each mobile station has its own channelisation code (or scrambling code) tree, since different uplink scrambling codes are allocated to different mobile stations. The code tree allocated to a particular mobile station will be shared among different radio access bearers (i.e. base stations) of that mobile station. However, with service multiplexing multiplexing of transport channels), either a single channelisation code (for spreading factor less than 4) is used or multiple channelisation codes (also known as multicode, for high data rate) are used. The uplink channelisation code is allocated in a predefined order. The mobile and the network (i.e. the base station) only need to agree on the code number (which may be predefined) and spreading of the codes. The spreading factor is implicitly given in the transport format combination indicator (TFCI) on the dedicated physical control channel (DPCCH). The exact codes to be used are thus implicitly given. Fast symbol rate change (at a resolution of 10 ms radio frame duration) is therefore possible on the uplink as long as the TFCI is decoded properly. No radio access bearer (RAB) modification is thus needed. However, due to the use of predefined channelisation code, the cross-correlation among, mobile stations may degrade and thus increase the interference level.

In the downlink, the channelisation code tree is shared among different mobile stations within a cell. This results in a downlink channelisation code shortage problem. A downlink channelisation code can only be allocated if and only if no other code on the path from the specific code to the root of the tree or in the sub-tree below the specific code is used within the same cell This restriction on channelisation code allocation applies as well to the uplink except that it is for a mobile station and not for a cell. Moreover, the allocation of uplink channelisation code can be easily predefined in such a way as to ensure that the restriction is not violated. As for the downlink channelisation allocation can be quite complicated since it has to share the channelisation code tree among different mobile stations. A change in spreading factor in the downlink requires performing the RAB modification procedure. This is because the DPCCH and the dedicated physical data channel (DPDCH) are time-multiplexed and thus use the same channelisation code. Decoding the TFCI in the DPCCH requires knowledge of the spreading factor in advance. Hence, a 10 ms symbol rate resolution change is not possible. A symbol rate change of 10 ms is still possible through dynamic rate matching, however the spreading factor is constant (i.e. set to lower spreading factor than is required for the physical channel). The problem is summarised as follows. In the uplink, there is an increase in in interference level due to the use of predefined channelisation code among mobile stations.

In the downlink, there is a complicated code allocation algorithm to optimise the use of the channelisation code tree, a slow spreading factor changes due to time-multiplexing of the DPCCH and DPDCH, and a code shortage problem due to a single code tree among different mobile stations within a cell.

It is therefore an object of the present invention to provide a technique for allocating a code branch in the uplink or in the downlink of a spread spectrum CDMA system which results in an improved system performance.

It is known from International Patent Publication WO95/03652 to provide a method of allocating a channelisation code in a code division multiple access system comprising for each user: selecting a node of a path in a code tree in dependence on the currently required spreading factor; and reserving all nodes on the code tree in an upward and downward direction from the selected node; wherein the selected node for any user must not coincide with a node reserved by any other user.

SUMMARY OF THE INVENTION

The present invention is characterised over the disclosure of WO95/03652 in that the path in the code tree is defined based on a required range of spreading factors, and wherein for each user the defined path is communicated to that user in the downlink during radio access bearer (RAB) establishment.

If a selected node does coincide with a node reserved by another user, a new path may be defined for the user.

The selected node for any user may not coincide with a node reserved by any other user only if the user and any other user are operational at the same time.

The method may further comprise the step of defining at least two paths in the code tree for any user.

The step of defining a path in the code tree may comprise defining an origin node for each user; and defining a path from the origin node based on the required range of spreading factors.

The selected node for each user may be communicated to the user in the data packets.

The invention will now be described by way of example with reference to the accompanying drawings, in which:

DESCRIPTION OF PREFERRED EMBODIMENT

The new technique for allocating channelisation codes described herein applies equally to channelisation code allocation in the uplink and the downlink. In the following description a general introduction to the concept of channelisation codes is given, followed by an overview of one current technique for allocating channelisation codes. Thereafter, the new technique of allocation of channelisation codes is described.

The channelisation codes for UMTS for the uplink as well as for the downlink are orthogonal variable spreading factor (OVSF) codes which maintain orthogonality between the different physical channels of one base station (downlink) or one mobile station (uplink), respectively. The OVSF codes can be described using the code tree of FIG. 1.

Figure 1:
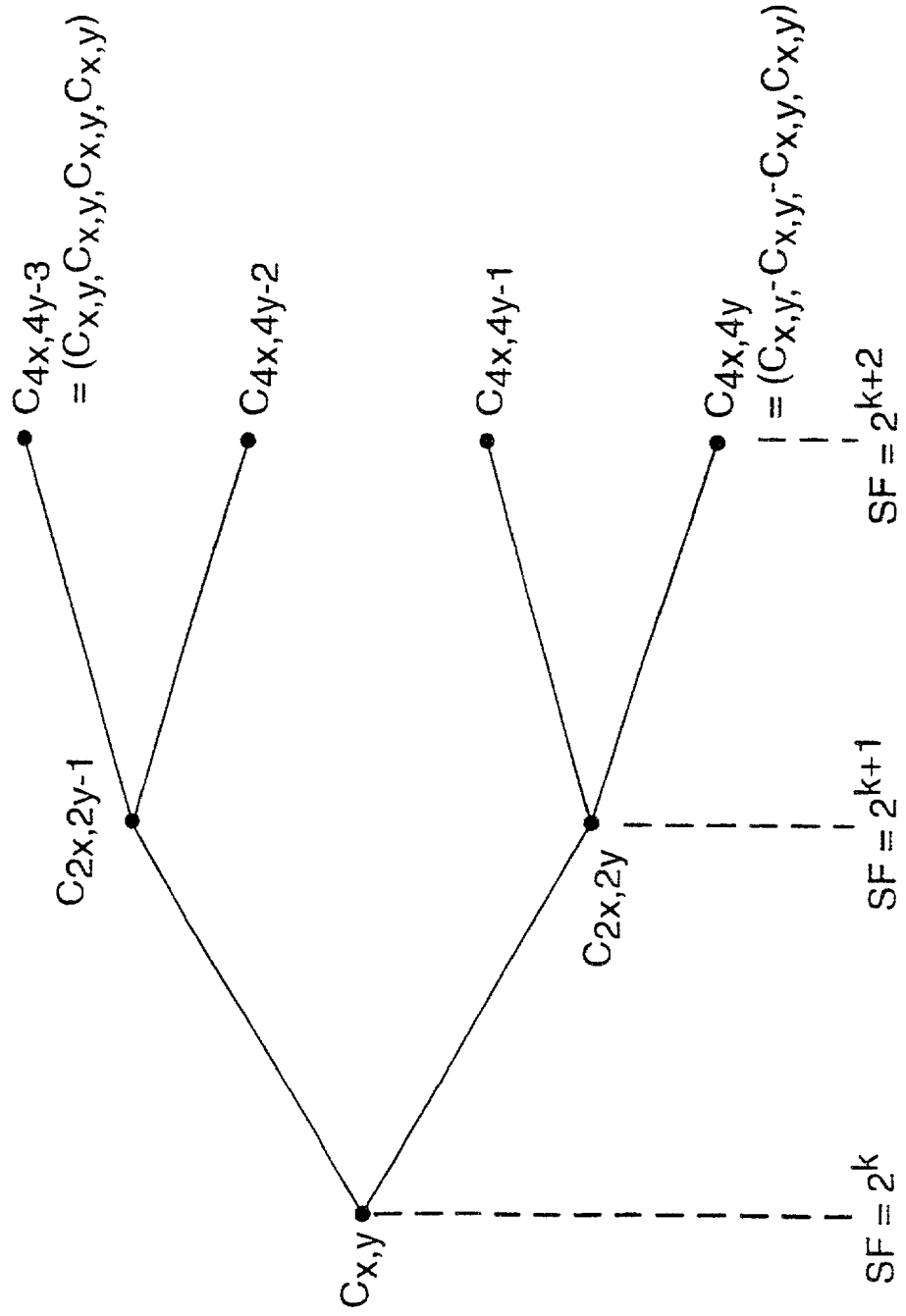
FIG. 1 illustrates the basic principle of a code tree.

The OVSF sequences are denoted by $C_{x,y}$ (y=1, . . . , x; x=$2^{k-1}$, k=1, . . . , 9). Each level in the code tree defines channelisation codes corresponding to a spreading factor of SF=x. The code with $C_{2x,2y-1}$ of the upper branch will be constructed by concatenation of two codes $C_{x,y}$ from the previous node. Thus for example, node $C_{4x,4y-3}$ is the concatenation of the node $C_{2x,2y-1}$ twice, which is in turn the concatenation of the node $C_{x,y}$ twice. $C_{2x,2y}$ from the lower branch is determined by the concatenation of one code $C_{x,y}$ and its negative $-C_{x,y}$. Thus, for example, the node $C_{4x,4y}$ is the concatenation of $C_{2x,2y}$ with its negative, which in turn is the concatenation of the node $C_{x,y}$ with its negative. The concatenation of nodes is illustrated in FIG. 1.

All codes within the code tree, as discussed hereinbelow, cannot be used simultaneously. In a known code allocation scheme (discussed in further detail hereinbelow), a code can be used for a physical channel if and only if no other code on the path from the specific code to the root of the tree or in the sub-tree below the specific code is used by another physical channel. This concept is described in further detail hereinbelow, with reference to a specific example.

The general steps to be taken in a known scheme for allocating channelisation codes in a downlink are described below. It will be appreciated by one skilled in the art how this technique may be utilised in the uplink.

In the down link the code tree is shared by all users, and a branch of the code tree is allocated for each user, each user having a unique channelisation code. This allocation effectively comprises two steps which are discussed in further detail hereinafter: defining an origin node on the tree; and defining a path from the origin node on the tree.

A channelisation code is typically allocated for a number of expected symbol rates, the symbol rate in turn determining the spreading factor. That is, the down link channelisation code allocated to a particular user is based on the fact that it is known the user will require a symbol rate within a particular range. Thus channelisation codes within this range must be allocated. For allocation and de-allocation of radio resources, the highest symbol rate, i.e. the lowest spreading factor, first needs to be determined. This then gives the channelisation code for the lowest spreading factor, and defines the origin node, or initial node, in the code tree.

In this known technique, a node (and its sub-tree) can be assigned to one physical channel if and only if no other node on the path from the specific node to the root of the tree or in the sub-tree below the specific node is used by another physical channel from the same base station (downlink). Thus the code tree must be looked into in both directions from the initial node. From observation of the code tree of FIG. 1, this requirement can be defined by two rules as follows:

1. If the origin node with code $C_{x,y}$ (x=$2^{k-1}$, y<x) is used, all subsequent nodes (in the downward direction) with code $C_{vx,v(y-1)+\mu}$ (v=$2^n$, n≧0 and μ=1, . . . , v) are reserved or occupied and cannot be used by another physical channel.

2. From $C_{x,y}$ (x=$2^{k-1}$, y<x), in the upward direction, all codes with $C_{vx,[vy]}$, (v=$2^n$, n≦0) are reserved or occupied and cannot be used by another physical channel. The term [v.y] denotes the next highest integer number of (v.y).

Rule 1 must be considered for allocation of sequences with a spreading factor of interest of SF≧x; Rule 2 is for allocation of sequences with a spreading factor of interest of SF≦x.

Figure 2:
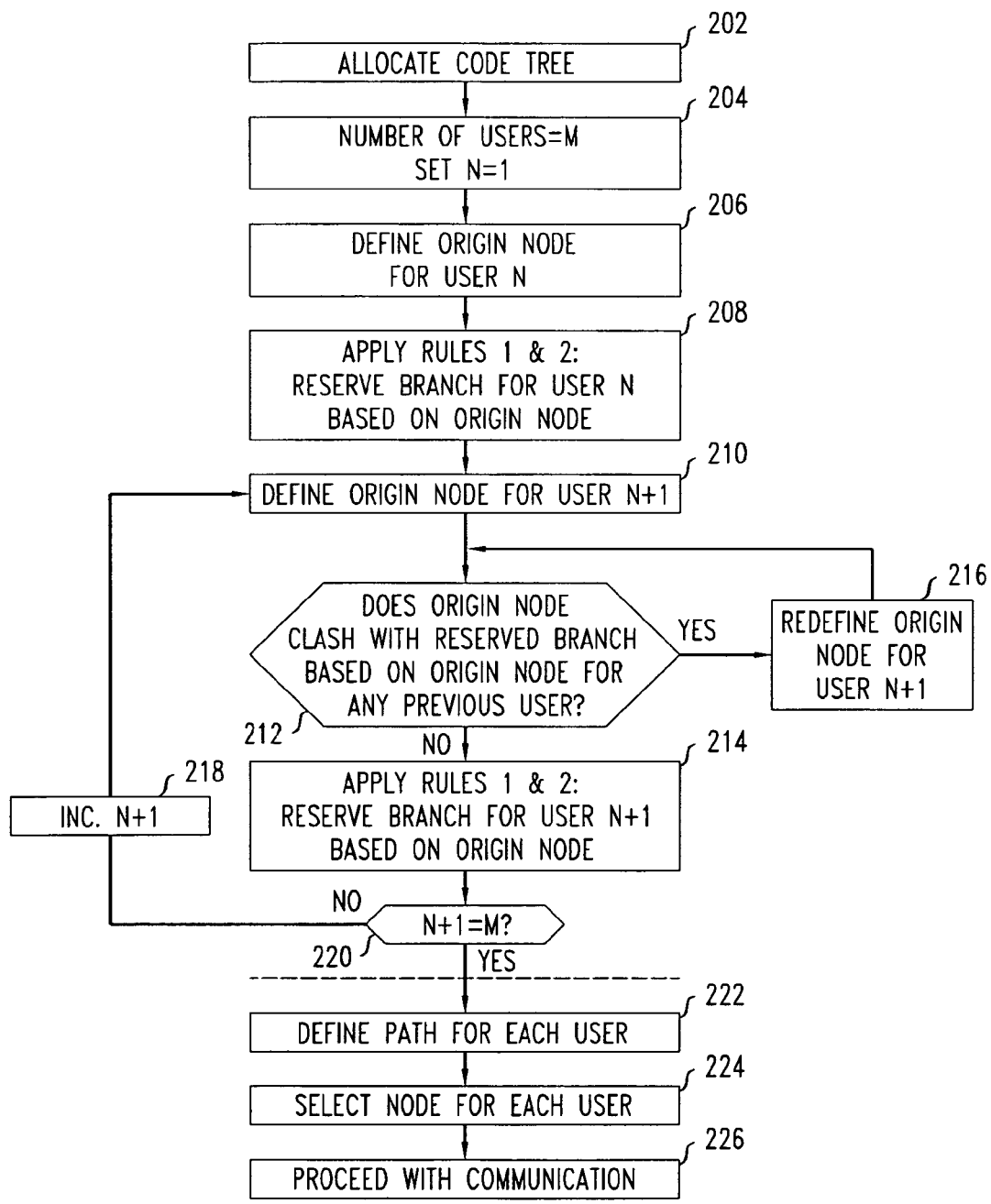
FIG. 2 is a flow diagram illustrating the general steps of a channelisation code allocation technique according to the prior art.
Figure 3:
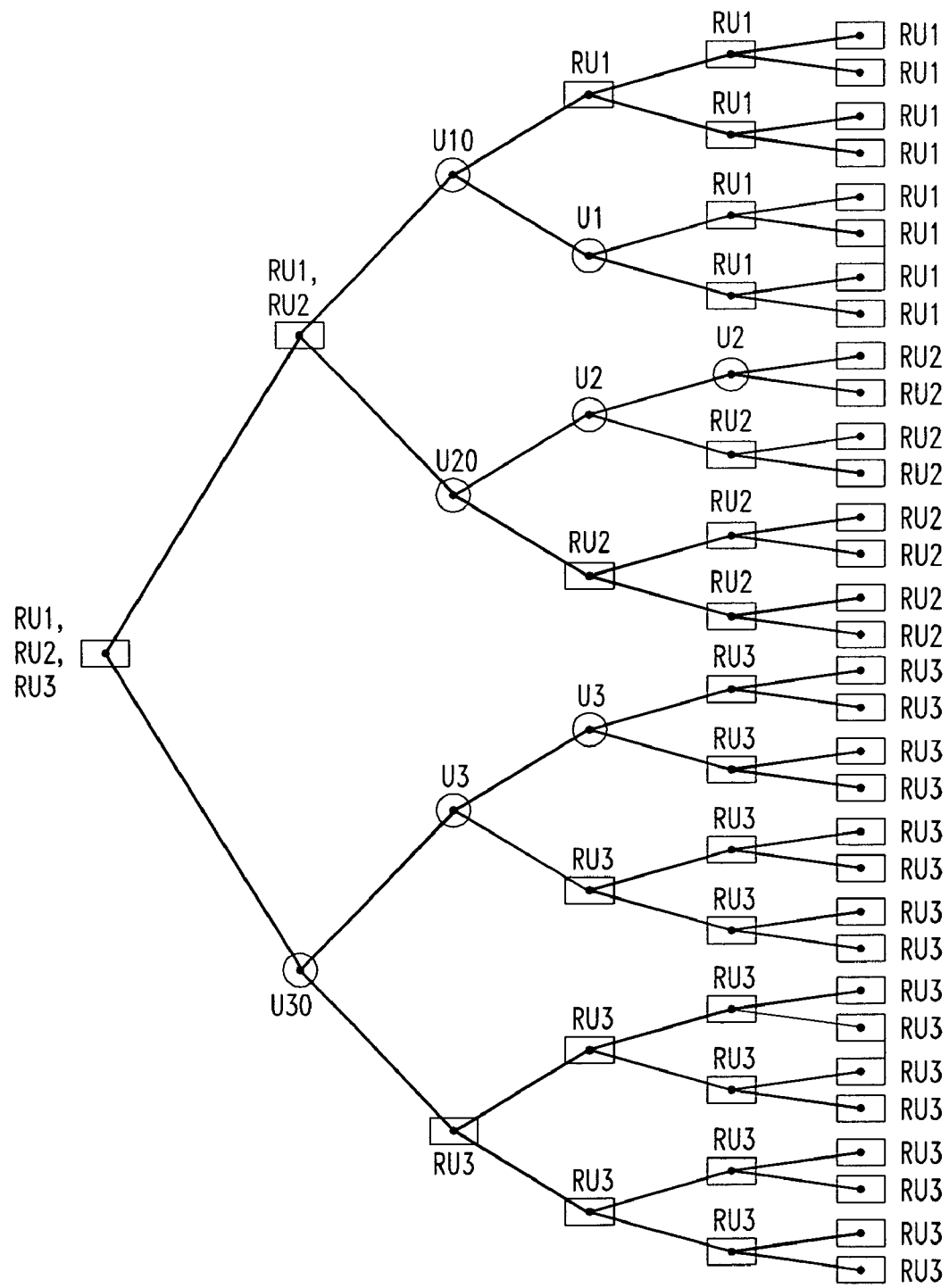
FIG. 3 illustrates a specific example of code allocation according to the technique of FIG. 2.

The allocation of channelisation codes in the downlink according to a known technique will now be described with reference the flow chart of FIG. 2 and the specific example as illustrated by FIG. 3.

In this example, it is assumed that there are three users. A first user requires a channelisation code with a spreading factor in the range of 4 to 8, a second user requires a channelisation code with a spreading factor in the range 4 to 8, and a third user requires a channelisation code with a spreading factor in the range 2 to 8.

In a first step 202, a code tree is allocated for the downlink, being the code tree generally shown in FIG. 3. In a second step 204, the number of users is determined, and a parameter M set to be equal to the number of users. In the present example M is set equal to 3. At this stage a further parameter N is set to a value 1.

In a step 206, an origin node for the user N, i.e. the first user, is determined. The origin node for each user is determined based on the lowest required spreading factor for each user. There are various techniques known for determining the origin node. In the present example it is assumed that the origin node is allocated based on the first node available in the tree. For the first user, the minimum required spreading factor is 4. Node C4,1, designated by U10 in FIG. 3, is allocated as the origin node for the first user.

In a step 208, Rules 1 and 2 discussed hereinabove are applied for the first user (user N) based on the determined origin node. Thus, all nodes from node C4,1 in an upward and downward direction of the tree are reserved for the first user 1. The reserved nodes are indicated by the nodes marked RU1 (and U1) in FIG. 3.

In a next step 210 an origin node is defined for the second user (i.e. user N+1). The minimum required spreading factor for the second user is 4, and therefore an origin node with spreading factor 4 is selected. Node C4,1 is allocated as the origin node, being the first node with a spreading factor of 4.

In a step 212 it is determined whether the allocated node for the second user clashes with the reserved branch based on the origin node for any previous user, in this case the only previous user being the first user. As the node C4,1 has been reserved by the first user (and is in fact the first users origin node), the allocated node for the second user does clash. In a step 216, the origin node for the second user is therefore redefined. The next successive node with a spreading factor of 4 is allocated to the second user, and then checked for a clash in step 212 again.

On this occasion there is no clash, and this node is therefore the origin node, designated U20, for the second user. The code allocation technique proceeds to step 214. In step 214 Rules 1 and 2 are applied based on the origin node for the second user. All nodes in an upward and downward direction from node C4,2 are reserved by user 2, as indicated by the designation of nodes marked RU2 (and U2) in FIG. 3.

In a step 220, it is determined whether the current value N+1 is equal to M. At this point N+1 corresponds to 2, and therefore is not equal to M (3). In a step 218 the value N+1 is incremented (to 3), and then the step 210 repeated for the third user. The third user has a minimum spreading factor of 2. In step 210 the node C2,1 is defined as the origin node for the third user. In step 212 it is determined that this origin node clashes with the reserved branch for both the first and second users. In step 216 node C2,2 is allocated to the third user. In step 212 it is determined that this does not clash with any reserved branch, and this mode is therefore the origin node, designated U30, for the third user. Then in a step 214 all the upward and downward nodes from node C2,2 are reserved by the third user as designated by the nodes marked RU3 (and U3) in FIG. 3.

In step 220 it is determined that N+1 is equal to M, and the code allocation technique proceeds to step 222.

Having defined the origin nodes for all current users, the paths for all users must be defined. The lengths of the paths are determined by the required spreading factors to be supported.

As discussed above, the codes of the upper branch are a straight concatenation of codes from the previous nodes, whereas the codes of the lower branches of the code tree are a concatenation of the codes from previous nodes with their negatives. From the theoretical point of view both ways are assumed equivalent. However, from the implementation point of view the upper branch is preferred. Using the lower branch at every change of the spreading factor the modulation sequence for the channelisation code must be changed by insertion or leaving out of the negative code. In contrast, using the upper branch the modulation sequence does not change during variation of the spreading factor, because every code of the subsequent nodes consists of the concatenation of codes from the previous nodes. Therefore, by changing the spreading factor only the correlation period has to be changed but not the modulation sequence. Using the notation of the OVSF sequences the rule of choosing the upper branch of the code tree starting from the node with the lowest SF can be written in the following way, and defined as Rule 3:

3. If the node with lowest $SF_{min}=x$ is given by $C_{x,y}$ ($x=2^{k-1}$) use always the channelisation code of node $C_{v \cdot x, v \cdot (y-1)+1}$ with $v=2^n$, $n \geq 0$ ($SF_{actual}=v \cdot x$).

This rule implies that in the ideal case there may be no need to exchange the information about the whole code branch between mobile station and base station. Only the channelisation code for the lowest spreading factor and the actual used spreading factor must be known (in both the uplink and the downlink).

In practice, however, some nodes cannot be choosen due to, for example, interference. These nodes may be marked as not preferred nodes. The following node $C_{v \cdot x, v \cdot (y-1)}$ of the lower branch should be chosen, instead. All subsequent nodes are taken by Rule 3 starting with node until a node in this path is marked as non preferred, too.

In step 222, the path for each user is defined. The first user requires a spreading factor of up to 8. It is assumed in FIG. 3 that it is undesirable to use the node C8,1, and therefore the path is defined from C4,1 to C8,2. The path defined for the first user is seen in FIG. 3 from the origin node U10 to the node designated U1.

Similarly for the second and third users for the respective required spreading factors discussed above the paths are defined. For the second user the path extends from the origin node designated by U20 to the nodes C8,3 and C16,5, each designated by U2. For the third user, the path extends from the origin node designated by U30 to the nodes C4,3 and C8,5, each designated by U3.

In a step 224, a particular node of the defined path is then selected to be used by each user. This is based upon the required spreading factor given the amount of data to be transmitted in the downlink associated with each user. For the purposes of the present example it is assumed that the first user has a required spreading factor of 8, the second user has a required spreading factor of 16, and the third user has a required spreading factor of 8.

In a step 226 communication then proceeds in the normal way.

Figure 4:
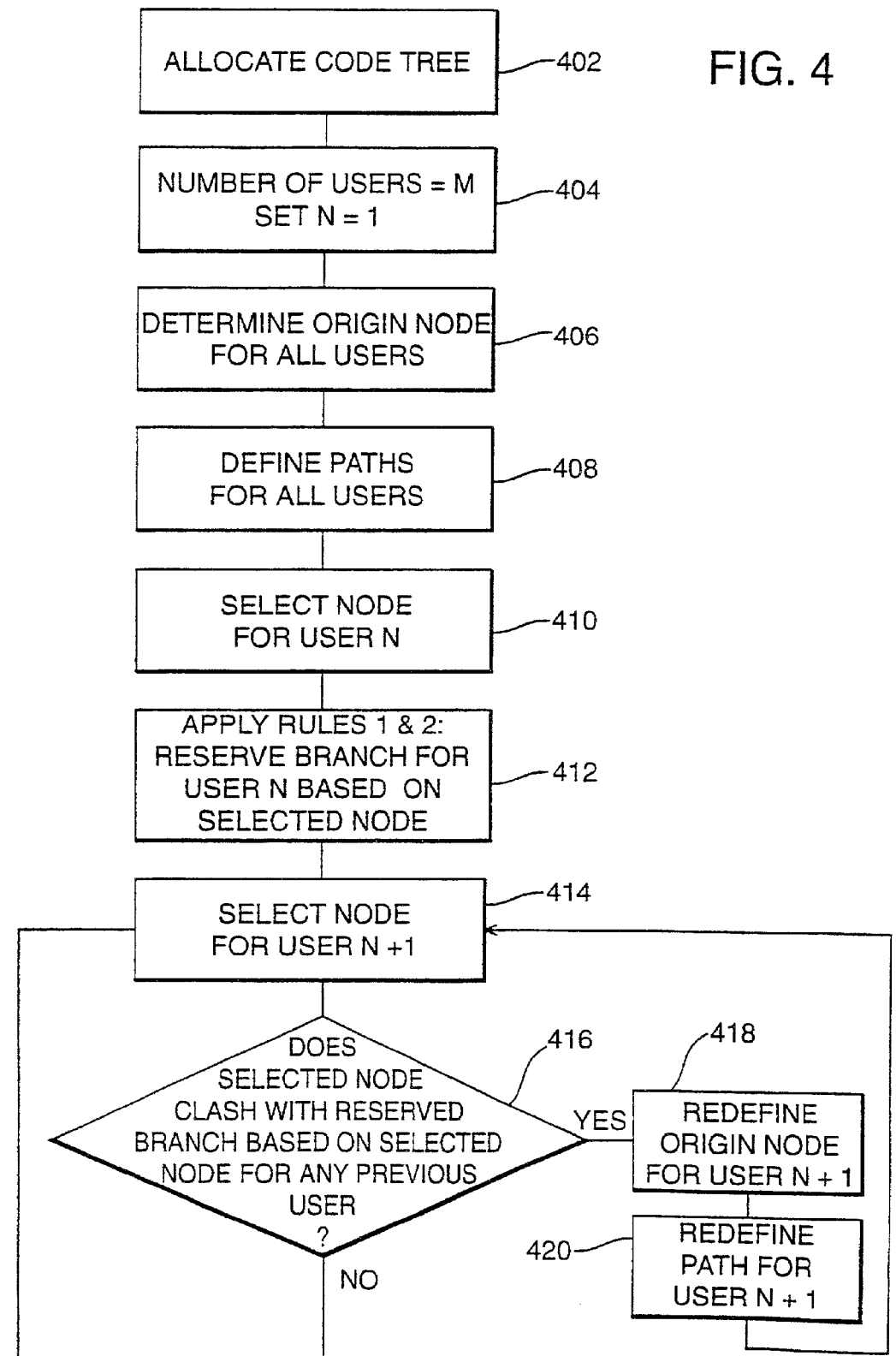
FIG. 4 is a flow diagram illustrating the general steps of a new channelisation code allocation technique.

The new code allocation technique improves on the above-described technique, by enabling channelisation codes to be re-used. Again, a specific example is given herein with reference to the downlink, but it will be readily understood how the technique extends to the uplink. FIG. 4 is a flow diagram illustrating the general principles of the new technique, and FIG. 5 represents a specific example to illustrate the new technique.

In the new technique a code tree for use in the down link is allocated, as before, in a step 402. The allocated code tree is shown in FIGS. 5(*a*) and 5(*b*) and corresponds to the code tree of FIG. 3.

For the purposes of the present example according to the invention it is again considered that there are the same three users. In a step 404, corresponding to step 204, the parameter M is set to the number of users (3), and the parameter N is set to 1.

In a step 406 origin nodes are allocated for each of the users. The origin nodes may be allocated to each user irrespective of the origin nodes allocated to other users. In the present example, as illustrated by FIG. 5(*a*), node C4,1 is allocated as the origin node for both the first and second users, and node C2,2 is allocated as the origin node for the third user. It will be appreciated, however, that the technique for allocating the origin node may vary and will be implementation dependent. It will be understood that if there were three users each with a minimum spreading factor of 2, then one of the nodes C2,1 and C2,2 would be allocated twice. In the prior technique described hereinabove, if there were three users each with a minimum spreading factor of 2 then there would not be sufficient codes to allocate. Obviously, this concept extends to more realistic examples. If there were seventeen users each with a minimum spreading factor of 16, then in the prior technique there would not be sufficient channelisation codes to allocate. In the present invention, one of the nodes C16,1 . . . C16,16 would be allocated twice.

A method must generally be provided to arrange the origin nodes associated with different channelisation codes within the code tree, rather than the origin nodes being arbitrarily allocated. It is assumed that the RRA (radio resource allocation) algorithm has successfully checked the requested resources against the code space (i.e. the RRA algorithm has checked that there is sufficient code space to allocate resources to the users). Several methods for the arrangement of origin nodes are possible. Two particularly advantageous practical solutions are described below.

In a first solution, at every run of the RRA algorithm, all physical channels are sorted according to the necessary spreading factor. The sequences will be allocated in order of their spreading factor: e.g. at first the channels with highest spreading factor will be allocated to codes $C_{x,y}$ with smallest x and y, then channels with next lower SF will be allocated to nodes $C_{x,y}$ with higher x and y etc. This procedure must be done iteratively, because after every allocation of a node to a channel an indication that subsequent and previous nodes are not available must be done according to Rules 1 and 2. This method of allocation/de-allocation of nodes is simple, because all connections are handled equally as new connections. At every change of at least one channelisation code a complete reshuffling of the code tree is done. In a second solution, the channelisation codes are allocated according to the time of arrival of the RRC (radio resource control) connection requests. The allocation may be as follows. The first available code $C_{x,y}$ with minimum x and y is given to the first incoming request, the next available code to the next request etc. Thus, code shuffling due to changes of a channelisation code is only done in the case that code branches starting with nodes of a higher spreading factor on different paths can be combined to avoid waste of code space (similar to de-fragmentation). Allocation and de-allocation of the nodes must be done in consecutive steps, because the connections are now of three types: released, changed and new ones.

In addition to the two above alternative methods for allocating origin nodes, nodes with a bad interference situation can be considered as not preferred. If there is enough code space available, then the code sequence of such nodes should not be used.

Once the origin nodes are allocated, then the paths for each user are defined in a step 408. In the illustrated example of FIG. 5(a), for the first user a path from the origin node U10 extends through nodes C8,1 and node C16,1, designated by numerals U1. For the second user a path extends from the origin node U20 to node C8,2 designated by U2. For the third user a path extends from the origin node U30, through nodes C4,3 and C8, 5 designated by U3.

Figure 5A:
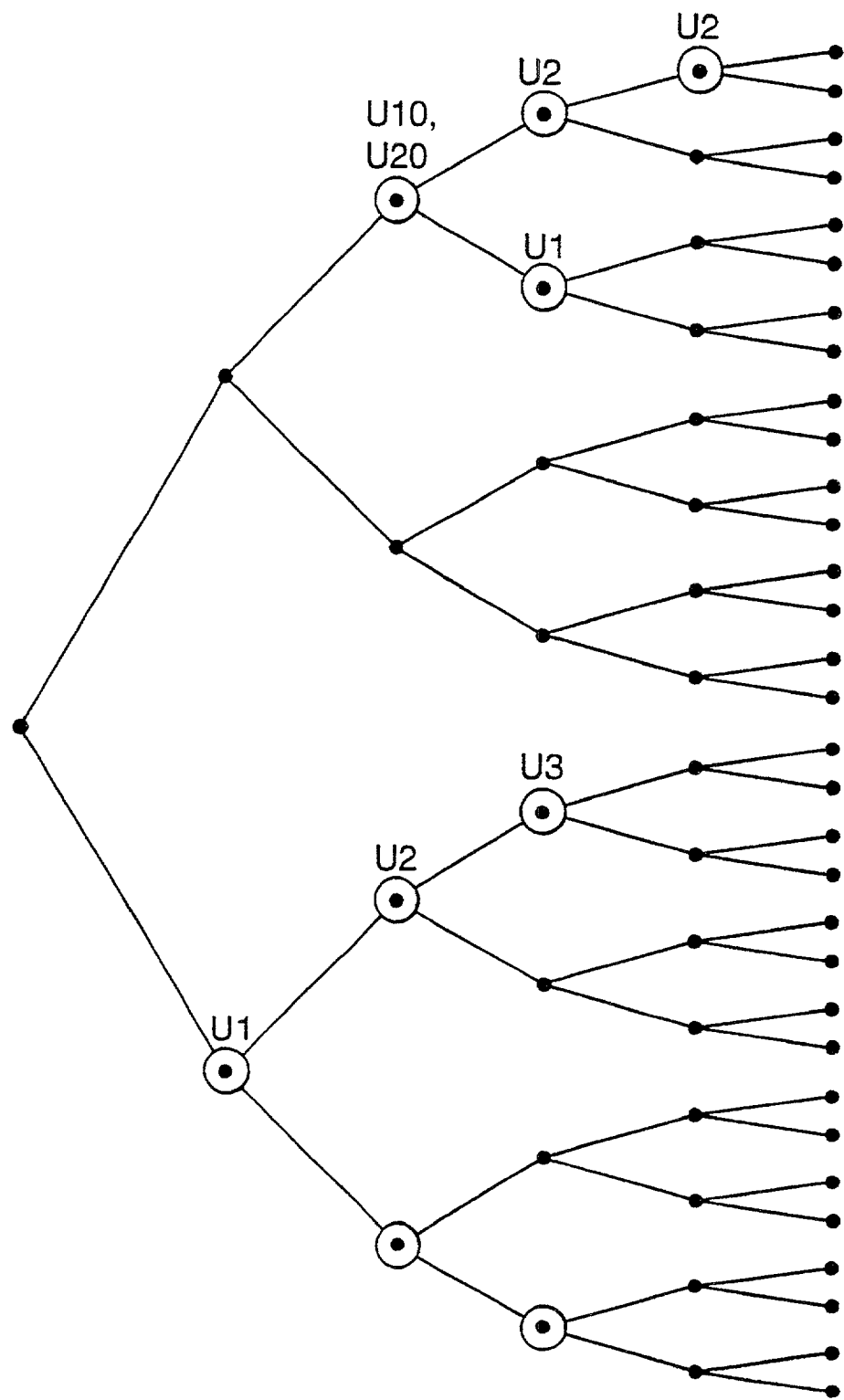
FIGS. 5(a) and 5(b) illustrate a specific example of code allocation according to the technique of FIG. 4.
Figure 5B:
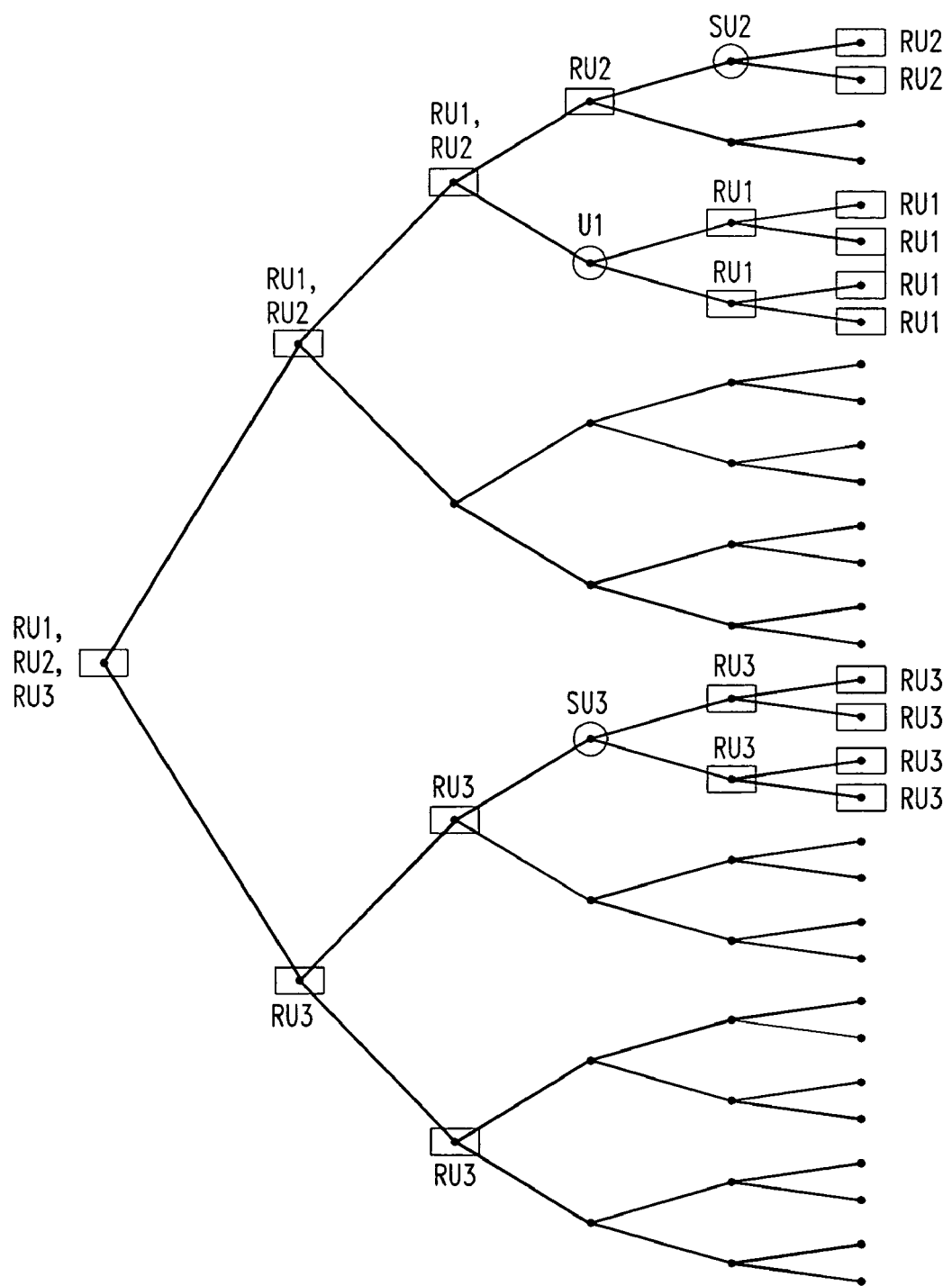

Based on the amount of data to be transmitted in a particular communication, the spreading factor for the first user (user N) is then determined in a step 410. For the first user a required spreading factor of 8 is determined (as before) and node C 8,2 therefore selected for use in the downlink of the first user. In accordance with the new technique, in a step 412 the Rules 1 and 2 are then applied in dependence on the selected node for the first user. Referring to FIG. 5(b), the selected node for the first user is designated by SU1, and the nodes in the upward and downward direction therefrom reserved, as designated by RU1.

In a step 414, a node is selected for the second user (N+1) based on the determined spreading factor to be used. As before, the determined spreading factor is 16, and node C16,1 is therefore selected as designated by SU2 in FIG. 5(b).

In a step 416 it is checked whether the selected node for the second user clashes with a branch reserved (according to Rules 1 and 2) for any previous user. In the present case, no clash takes place.

If, however, the selected node did clash, then in a step 418 the origin node for the second (N+1) user is redefined, and in a step 420 the path for the second user redefined. The steps 414 and 416 are then repeated. When it is determined that the selected node does not clash with a reserved branch for a previous selected node, in a step 422 the Rules 1 and 2 are applied for the second user to reserve a branch in the upward and downward direction. For the second user, as shown in FIG. 5(b), the selected node for the second user is designated SU2, and the nodes in the upward and downward direction therefrom reserved, as designated by RU2. In a step 424 it is determined whether the value N+1 is equal to M. At this stage in the example the value N+1 is 2, and the technique proceeds to step 426, where the value of N+1 is incremented to 3. The node is selected for the third user in step 414 based on the required spreading factor of 8 (as before). In step 416 it is determined that the selected node, designated by SU3 in FIG. 5(b), does not clash with any reserved branch based on a selected node for another user.

In step 422 Rules 1 and 2 are applied to reserve the branch based on the selected node for the third user, and the upward and downward nodes reserved as designated by RU3 in FIG. 5(b).

In step 424 it is determined that N+1 is equal to M, and in a step 428 the communication is proceeded with.

The new technique thus allows the crossing of the defined paths for different users based on all possible channelisation codes for those users, which is positively prevented in the known technique described hereinabove due to Rules 1 and 2 being applied based on the origin node. The new technique allows the re-use of channelisation codes which in turn mitigates the channelisation code shortage problem in the downlink.

In an embodiment, the present invention may still be allocated in accordance with the application of Rules 1 and 2. That is channelisation codes may initially be allocated according to Rules 1 and 2. When a code shortage occurs, i.e. the number of users exceeds the available code space allowed by Rules 1 and 2, the re-use technique of the present invention may be utilised.

The advantages of the new technique over the old technique described with reference to FIG. 2 can be easily understood by a comparison of FIG. 5(b) with FIG. 3. These two Figures show the allocated and reserved nodes of the code tree for the same users. As can be seen in FIG. 3, once the channelisation codes for the three users have been allocated, the code tree is full and there are no more available codes for use. Conversely, referring to FIG. 5(b), it is seen that based on the same three users a large amount of the code tree is still available for use.

Referring also to FIG. 5(b), it can be seen that if the spreading factor for a particular user changes, then it may be necessary to redefine the code tree.

For example, if the spreading factor for the first user changed to 4, then the node for the first user with a spreading factor of 4 (C4,1) would clash with a node reserved by the second user. If it is necessary that both users are supported at the same time, then it will be necessary to redefine the code tree. One way of efficiently dealing with this would be to allocate two defined paths to the first user in the beginning. Thus rather than merely moving along a defined path in response to a changing spreading factor, it is possible to move between defined paths.

It is also possible that when a clash is caused by the adaptation of the spreading factor for a particular user, that one of the two users which clash may have priority over the other. In this case one user may be stopped from operating whilst the other proceeds.

It is also possible that any two users may in any event not be operating at the same time. Thus even if a clash exists between a selected node and a reserved node there may be no detriment to performance if the two users do not operate at the same time.

Figure 6:
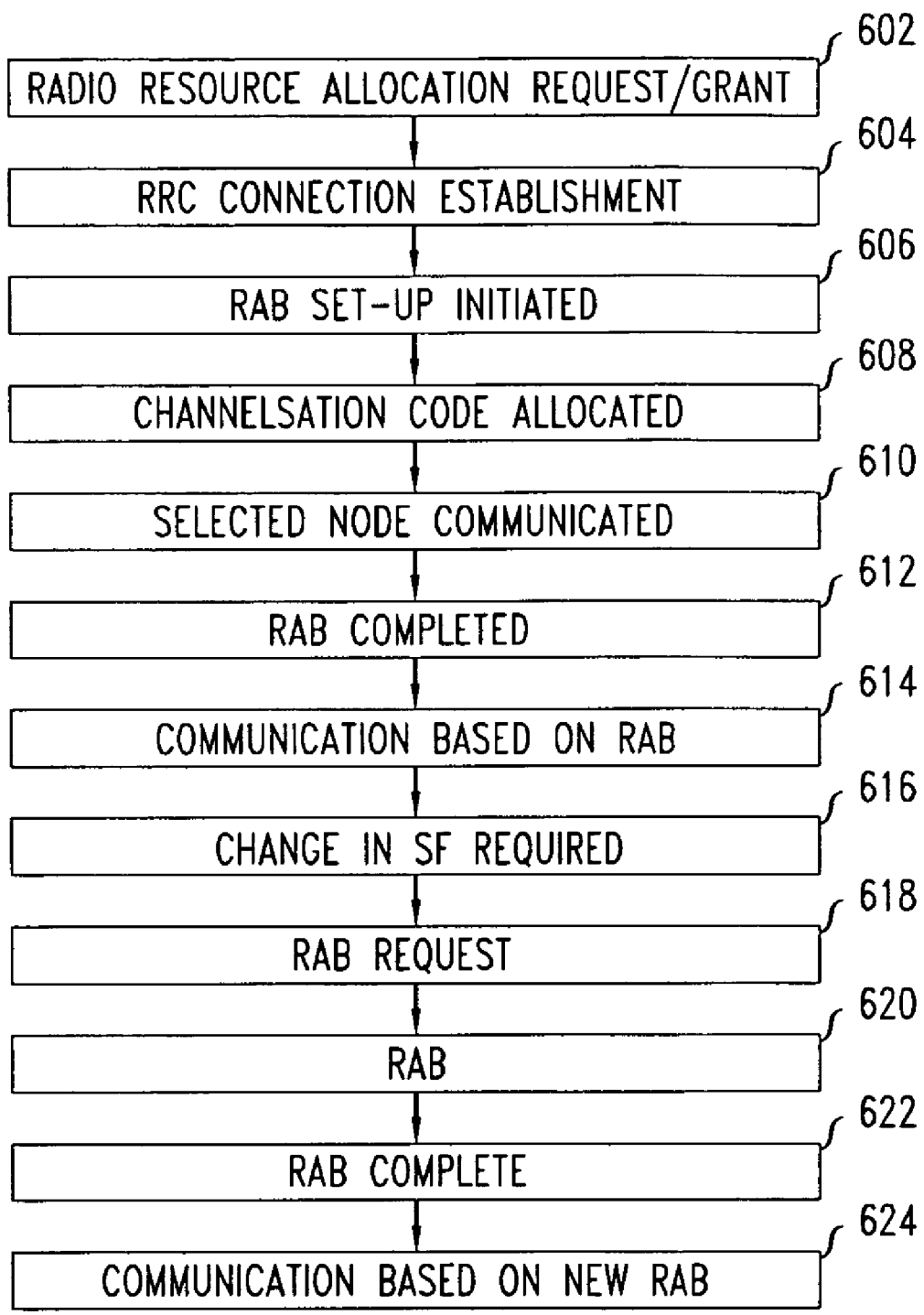
FIG. 6 illustrates the general steps in communicating a channelisation code for the downlink according to a known technique.

A technique for configuring the downlink connection between a base station and several users (mobile stations) according to the prior art will now be described. FIG. 6 illustrates the general steps of the prior art technique. If the downlink communication is initiated by a user, then in a step 602 a radio resource allocation establishment takes place. This consists of a user sending a radio resource allocation request to the base station, and the base station sending a radio resource allocation grant signal back to the user.

In a step 604 a radio resource control (RRC) connection establishment takes place. The RRC establishment establishes a signalling link between the user and the base station for exchanging control information. For example, the user may provide the base station with control information concerning the quality of service required for the communication session, such as the type of data. The RRC connection establishment will be familiar to one skilled in the art.

In a step 606 a radio access bearer (RAB) set-up procedure is initiated to establish the physical channel for user data. Again, the RAB establishment of steps 606 to 612 will be familiar to one skilled in the art, and only sufficient description is given herein to enable understanding of the how the new technique for communicating channelisation codes in the downlink, discussed further hereinbelow, operates.

In a step 608 the code for the user to use is determined, in accordance with the techniques of either FIG. 2 or 4, and then in a step 610 the selected node only of the code path allocated to the user is communicated to the user. Thus at this stage, the required spreading factor for the communication session is determined such that only the one of the nodes of the defined branch which is required for the current communication session is selected and communicated to the user.

In a step 612 the RAB procedure is completed, and then in a step 614 the downlink communication between the user and the mobile station proceeds based on the established RAB.

In a step 616, a change in the spreading factor for the particular user is required due, for example, to a change in the volume of data to be transmitted. In a step 618 a RAB request is initiated, and then in step 620 a RAB is performed, and a new selected node of the branch communicated to the user. In a step 622 the RAB is completed, and then in a step 624 communication continues based on the newly established RAB.

Thus once communication is established, every time there is a change required in the spreading factor of the channelisation code, due for example to a change in the bandwidth, then a new RAB establishment must take place.

Figure 7:
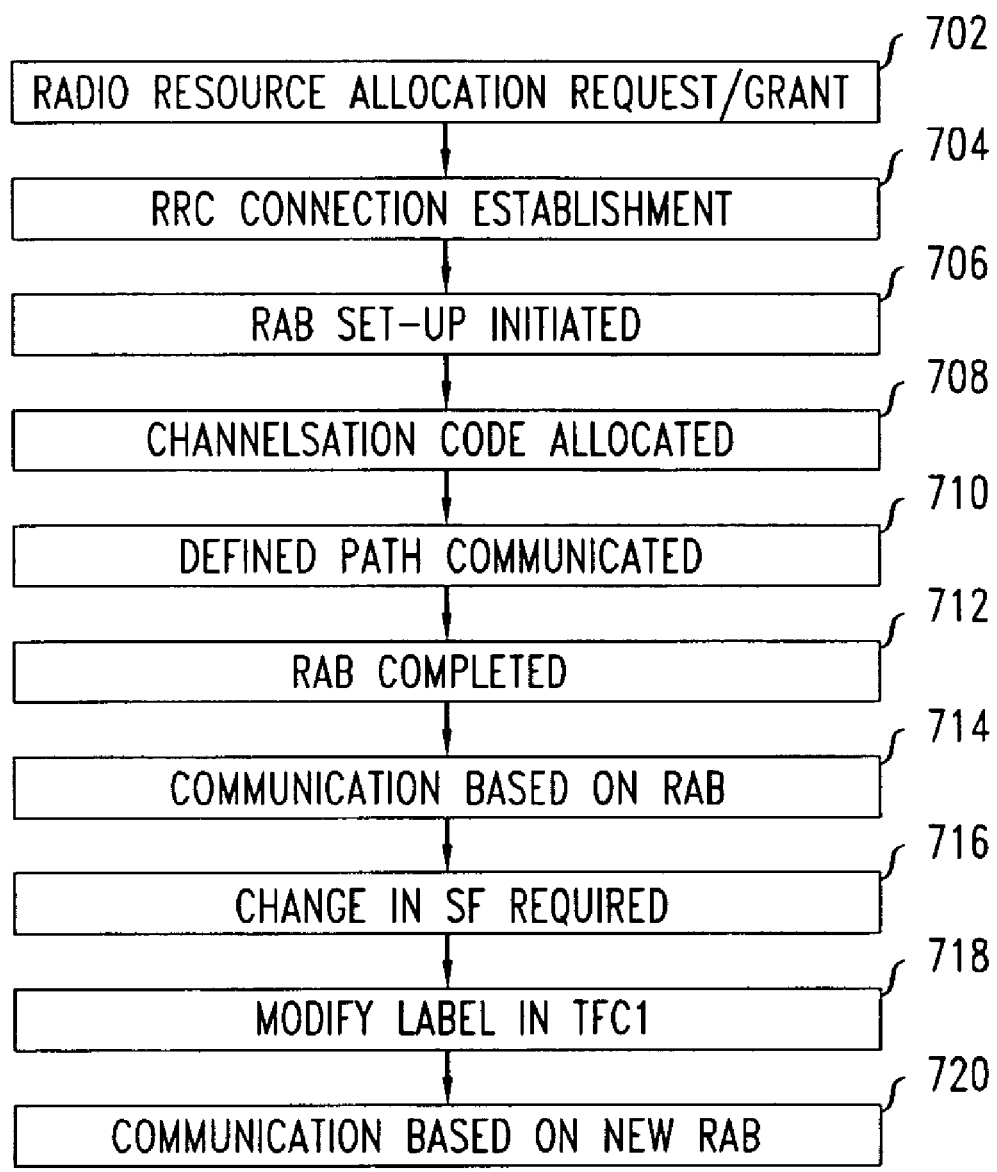
FIG. 7 illustrates the general steps in communicating a channelisation code for the downlink according to a new technique.

The new advantageous technique for establishing the downlink is now described with reference to FIG. 7. As before, if the downlink communication is initiated by a user, then in a step 702 a radio resource allocation establishment takes place. This consists of a user sending a radio resource allocation request to the base station, and the base station sending a radio resource allocation grant signal back to the user. In a step 704 a radio resource control (RRC) establishment takes place. In a step 706 a radio access bearer (RAB) set-up procedure is initiated to establish the physical channel.

In a step 708 a channelisation code is allocated to the user, preferably in accordance with the technique of FIG. 4.

In a step 710, the branch defined for the particular user is communicated to the user. That is, all possible nodes of the defined path are communicated to the user.

The allocated code path, i.e. the defined path, is communicated to the user during RAB establishment when the Transport Format (TF) and the Transport Format Combination Set (TFCS) is transmitted to the user via the RRC connection. The transport format consists of a dynamic part and a semi-static parts. The dynamic part is modified to include downlink channelisation code labels ($X_d$, $Y_d$ such that $C_{xd,yd}$).

Thus, referring to the example of FIGS. 5(a) and 5(b) hereinabove, for user 1 the downlink channelisation code labels [4,1; 8,2] would be sent, defining the path shown by U10 through U1 in FIG. 5(a). For user 2 the downlink channelisation code labels [4,1; 8,1; 16,1] would be sent, defining the path shown by U20 through U2 in FIG. 5(a). For user 3 the downlink channelisation code labels [2,2; 4,3; 8,5] would be sent, defining the path shown by U30 through U3 in FIG. 5(a).

The semi-static part remains as before. The purpose of adding the labels of the downlink channelisation codes is to accommodate fast changing of the spreading factor and its corresponding channelisation code.

Then in a step 712 the RAB establishment is complete. In a step 714, a communication based on the established RAB takes place. The data packets sent during the communication each include a transport format communication indicator (TFCI), and according to the new technique the TFCI is modified to include an identifier identifying the one of the set of nodes sent to the user in the TFS during RAB establishment to be selected for use in the downlink. Thus, again referring back to the example of FIGS. 5(a) and 5(b), for user 1 the TFCI will identify the second of the channelisation code labels sent during the RAB establishment.

In a step 716, a change in the spreading factor is required. In a step 718 the label in the TFCI of the data packets is therefore modified with the node of the branch for the new spreading factor, then in a step 720 the communication continues based on the originally established RAB.

Thus it can be seen that by communicating all possible nodes of the defined path for a user to the user during the RAB establishment, there is no requirement for the RAB establishment to be repeated each time there is a need to change the spreading factor, as is the case in the prior art.

The invention claimed is:

1. A method of allocating a channelisation code in a code division multiple access system comprising for each user,
    selecting a node of a path in a code tree in dependence on the currently required spreading factor; and reserving all nodes on the code tree in an upward and downward direction from the selected node; wherein the selected node for any user must not coincide with a node reserved by any other user, characterised in that the path in the code tree is defined based on a required range of spreading factors, and wherein for each user the defined path is communicated to that user in the downlink during radio access bearer (RAB) establishment, and wherein the selected node for a user must not coincide with a node reserved by another user only if the user and the other user are operational at the same time.

2. The method of claim 1, wherein if a selected node does coincide with a node reserved by another user, a new path is defined for the user.

3. The method of claim 1, further comprising the step of defining at least two paths in the code tree for any user.

4. The method of claim 1, wherein the step of
    defining a path in the code tree comprises defining an origin node for each user; and
    defining a path from the origin node based on the required range of spreading factors.

5. The method of claim 1, wherein the selected node for each user is communicated to the user in the data packets.

* * * * *